United States Patent [19]
Berkowitz et al.

[11] Patent Number: 5,832,479
[45] Date of Patent: *Nov. 3, 1998

[54] METHOD FOR COMPRESSING FULL TEXT INDEXES WITH DOCUMENT IDENTIFIERS AND LOCATION OFFSETS

[75] Inventors: Brian Thomas Berkowitz, Bellevue; Max Loell Benson, Redmond, both of Wash.

[73] Assignee: Microsoft Corporation, Redmond, Wash.

[ * ] Notice: The term of this patent shall not extend beyond the expiration date of Pat. No. 5,649,183.

[21] Appl. No.: 829,461

[22] Filed: Mar. 28, 1997

Related U.S. Application Data

[63] Continuation of Ser. No. 986,754, Dec. 8, 1992, Pat. No. 5,649,183.

[51] Int. Cl.[6] ........................................... G06F 17/30
[52] U.S. Cl. ................................ 707/3; 707/6; 395/898
[58] Field of Search ............................................ 707/1–6

[56] References Cited

U.S. PATENT DOCUMENTS

| | | | |
|---|---|---|---|
| 5,062,074 | 10/1991 | Kleinberger | 364/900 |
| 5,201,048 | 4/1993 | Coulter et al. | 395/600 |
| 5,293,552 | 3/1994 | Aalsbersberg | 364/419.19 |
| 5,313,604 | 5/1994 | Godwin | 395/425 |
| 5,321,833 | 6/1994 | Chang et al. | 395/600 |
| 5,375,235 | 12/1994 | Berry et al. | 395/600 |
| 5,398,338 | 3/1995 | Yoshida | 395/600 |
| 5,440,481 | 8/1995 | Kostoff et al. | 364/419.08 |
| 5,488,725 | 1/1996 | Turtle et al. | 395/600 |
| 5,649,183 | 7/1997 | Berkowitz et al. | 707/6 |

FOREIGN PATENT DOCUMENTS 0 124 097   11/1984   European Pat. Off. .

OTHER PUBLICATIONS

Mullin, J.K., "Accessing Textual Documents Using Compressed Indexes of Arrays of Small Bloom Filters," *The Computer Journal*, Aug. 1987, vol. 30, No. 4, pp. 343–348.

Choueka, Y. et al., "Compression of Concordances in Full–Text Retrieval Systems," *Proceedings of the 18th VLDB Conference*, Vancouver, British Columbia, Canada, Aug. 1992, pp. 352–362.

Witten et al., "Indexing and Compressing Full–Text Databases for CD–ROM," *Journal of Information Science*, vol. 17, n(5), pp. 265–271. Dec., 1990.

Zobel, Justin et al., "An Efficient Indexing Technique for Full–Text Database Systems," *Proceedings of the 18th VLDB Conference*, Vancouver, British Columbia, Canada, Aug. 1992, pp. 352–362.

*Primary Examiner*—Thomas G. Black
*Assistant Examiner*—Hosain T. Alam
*Attorney, Agent, or Firm*—Seed and Berry, LLP

[57] ABSTRACT

A method is disclosed for recording a text index wherein the text index comprises a plurality of data key fields. Each data key field includes a data key identifier, document identifier data, and an offset field. The document identifier data is provided to identify each document in which the data key identifier appears. The offset field includes a plurality of offset sequences wherein each offset sequence is associated with a respective document identified by the document identifier data and wherein each offset sequence identifies the location of each data key within its associated document by identifying the offset of the data key from the preceding data key. In accordance with the subject invention, the document identifier data and the offset data field are compressed by disclosed methods.

29 Claims, 10 Drawing Sheets

5,832,479

METHOD FOR COMPRESSING FULL TEXT INDEXES WITH DOCUMENT IDENTIFIERS AND LOCATION OFFSETS

CROSS REFERENCE TO RELATED APPLICATION

This application is a continuation of U.S. patent application Ser. No. 07/986,754, filed Dec. 8, 1992 now U.S. Pat. No. 5,649,183.

FIELD OF THE INVENTION

The subject invention is directed toward database storage techniques and, more particularly, toward an improved method for compressing full text indexes.

BACKGROUND OF THE INVENTION

Computer databases for storing full text indexes have become common for text storage and retrieval. These databases enable a user to search the index for particular data strings within the stored text. Typically, the index data is stored in a data structure separate from the text data of the database and, therefore, constitutes memory overhead. The memory overhead is justified since the index enables the user to quickly search the text data for the desired data string. However, it is desirable to minimize the memory overhead required for the index.

Many prior art methods provide an index by identifying each data string and associating with the data string an identifier of each location within the database that the data string appears. These indexes are obviously cumbersome and utilize a large amount of memory overhead. In similar fashion, other prior art methods using such indexes also use data compression techniques to reduce the memory overhead required. Nonetheless, these methods require memory for the index equal to between 50% and 100% of the memory required for the database, i.e., 50%–100% overhead.

Other methods for providing a text index have assigned codes to certain data sequences whereby the data sequence can be indexed as discussed above. Although this method works well for databases that exhibit strong patterns in data sequences, the method is not acceptable for databases having relatively few patterns in data sequences. Therefore, it is desirable to provide a method and apparatus for storing full text indices wherein the memory overhead required for the index is less than 20% of the storage required for the database.

SUMMARY OF THE INVENTION

The present invention comprises a method for storing index data of the type for providing a content index for a storage volume wherein the storage volume has a plurality of documents stored thereon. Each document has a unique document identifier and includes a plurality of data keys. The data key field provides the number of occurrences and location within the storage volume for a target data key. The method includes the steps of providing a data key identifier for identifying the target data key that is the subject of the data key field. Defining a document data set including a plurality of document identifiers each describing a plurality of target documents in which the target data key is located and, thereafter, compressing the document data set into document identifier data in accordance with a first predetermined compression scheme so that when decompressed the document data set will be recovered. Providing a plurality of count values wherein each count value is associated with a respective one of the plurality of document identifiers in the document data set and identifies the number of occurrences of the target data key in the document identified by its respective document identifier. The method also includes the step of providing a plurality of data key offset value sets wherein each data key offset value set is associated with a respective one of the plurality of count values and wherein each data key offset value set includes a plurality of data offset values equal in number to the number of occurrences of the target data key identified by its respective count value. Accordingly, each data key offset value identifies the location of the target data key in the document identified by the document identifier associated with the count value of with its respective data key offset value set.

In a first embodiment of the invention, the document data set is compressed by the method including the step of defining the range of document identifiers by selecting the minimum document identifier and maximum document identifier as the end points of the range. After the range is selected, the mid-point between the end points of the range of the document identifier is identified to partition the range of document identifiers into first and second groups. The document identifiers are then compressed by providing document identifier data to characterize the distribution of the documents between the first and second groups wherein the document identifier data identifies each of the document identifiers in the range.

In a second embodiment of the invention, the plurality of data key offset values are also compressed in accordance with a method including the step of selecting a base number of data bits N. The method further includes the step of selecting a portion, r, of the most significant bits from the base number of data bits to indicate that a data key offset value is encoded and identifying the remaining least significant data bits as the base number, q, so that r+q=N. Thereafter, a determination is made as to whether a data key offset value can be represented with N bits without the r most significant bits being set and, if so, the data key offset value is represented with N bits. If, however, the data key offset value cannot be represented with N bits without the r most significant bits being set, then the r most significant bits are set and the q least significant bits of the data key offset value used with the r most significant bits being set to indicate that the most significant bits of the data key offset value are encoded.

DETAILED DESCRIPTION OF THE INVENTION

Figure 1:
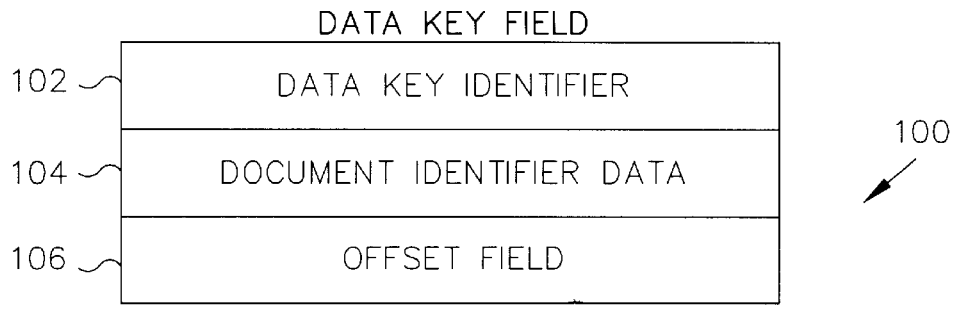
FIG. 1 is a chart illustrating the overall structure of a text index database stored in accordance with the subject method.

As mentioned above, the subject invention provides a method for storing a full text index wherein the memory overhead required to store the index is minimized. In general, the index of the subject invention comprises a plurality of data key fields 100, the structure of which is illustrated in FIG. 1. Each data key field 100 includes a data key identifier 102, a document identifier data 104, and an offset field 106. The data key identifier 102 is a data word used to identify a text or data sequence to be indexed. As an example, a text database may be developed to record the text of articles from a periodical such as a monthly publication. The text index may be comprised of words that appear in the articles of the periodical. The data key identifiers 102 of the text index will be used to identify the separate words to be located in the periodical.

The data key field 100 is provided to associate the data key identifier 102 with its respective document identifier data 104 and offset field 106. The document identifier data 104 is data that identifies each document in the database in which the text sequence associated with the data key identifier 102 appears. In the foregoing example, the document identifier data 104 will identify each article in the periodical database in which the word identified by the data key identifier 102 appears.

Figure 2:
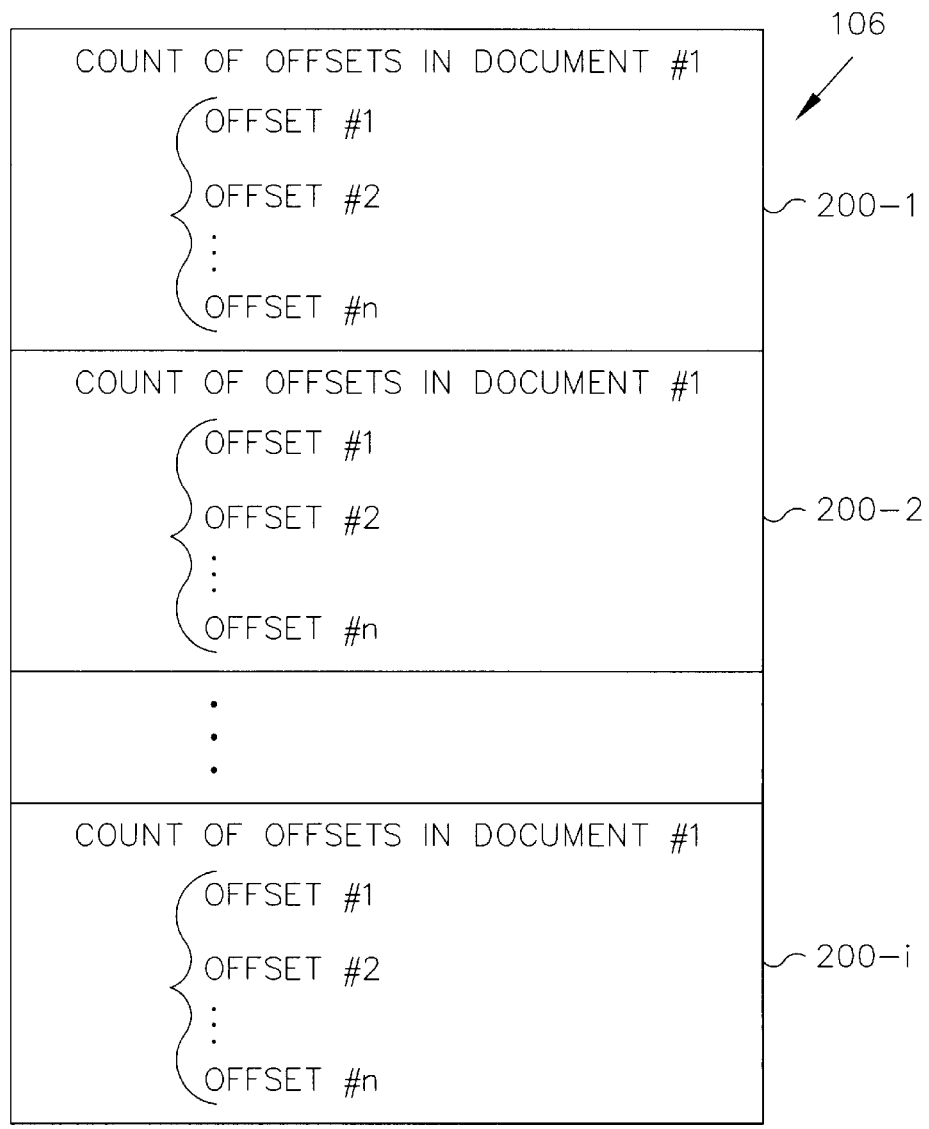
FIG. 2 is a chart illustrating the structure of an offset field of a text index stored in accordance with the subject method.

The offset field 106 comprises a plurality of offset data sequences 200-1 to 200-i, as illustrated in FIG. 2. In accordance with the subject invention, an offset data sequence 200 is provided for each document identified by the document identifier data 104 (FIG. 1). Each offset data sequence 200 includes a plurality of offsets, n, wherein each offset identifies the location of the data key identifier 102 in the document corresponding to the offset data sequence. As an example, the first offset data sequence 200-1 corresponds to the first document identified by the document identifier data 104. Offset number 1 identifies the first offset of the text sequence identified by the data key identifier 102 within the first document. Offset number 2 identifies the second offset of the text sequence within the first document, etc. As discussed in more detail below, one presently preferred embodiment of the invention is structured so that each offset is measured from the preceding offset thereby to minimize the value of the offsets provided in the offset data sequences 200. However, those skilled in the art will appreciate that other methods exist for providing the plurality of offsets without departing from the scope of the present invention.

With further reference to the foregoing example of a periodical data base, a data key identifier 102 may be provided to identify a predetermined word. The data key field 100 will include this data key identifier 102 along with document identifier data to identify each article in which the word appears. The offset field 106 will include a count of offsets associated with each document identified by the document identifier data 104. Each offset will identify the location of the word within the document by providing a value indicative of the offset of the word from the previous offset. For instance, the first offset may be 20 indicating that the word first appears as the $20^{th}$ word of the document. The second offset may be 50 indicating that the second time the word appears is 50 words from the first occurrence, which is 70 words from the beginning of the document.

In accordance with the method described above, a text index can be efficiently stored to enable a user to locate offset data sequences within a database. The foregoing method for storing a text index efficiently conserves memory thereby reducing memory overhead. However, a further reduction in the amount of memory overhead necessary for storing the text index can be achieved by providing methods for compressing the various components of the data key field 100. Particularly, methods may be provided for compressing the document identifier data 104 and the offset field 106, as discussed more fully below.

Figure 3A:
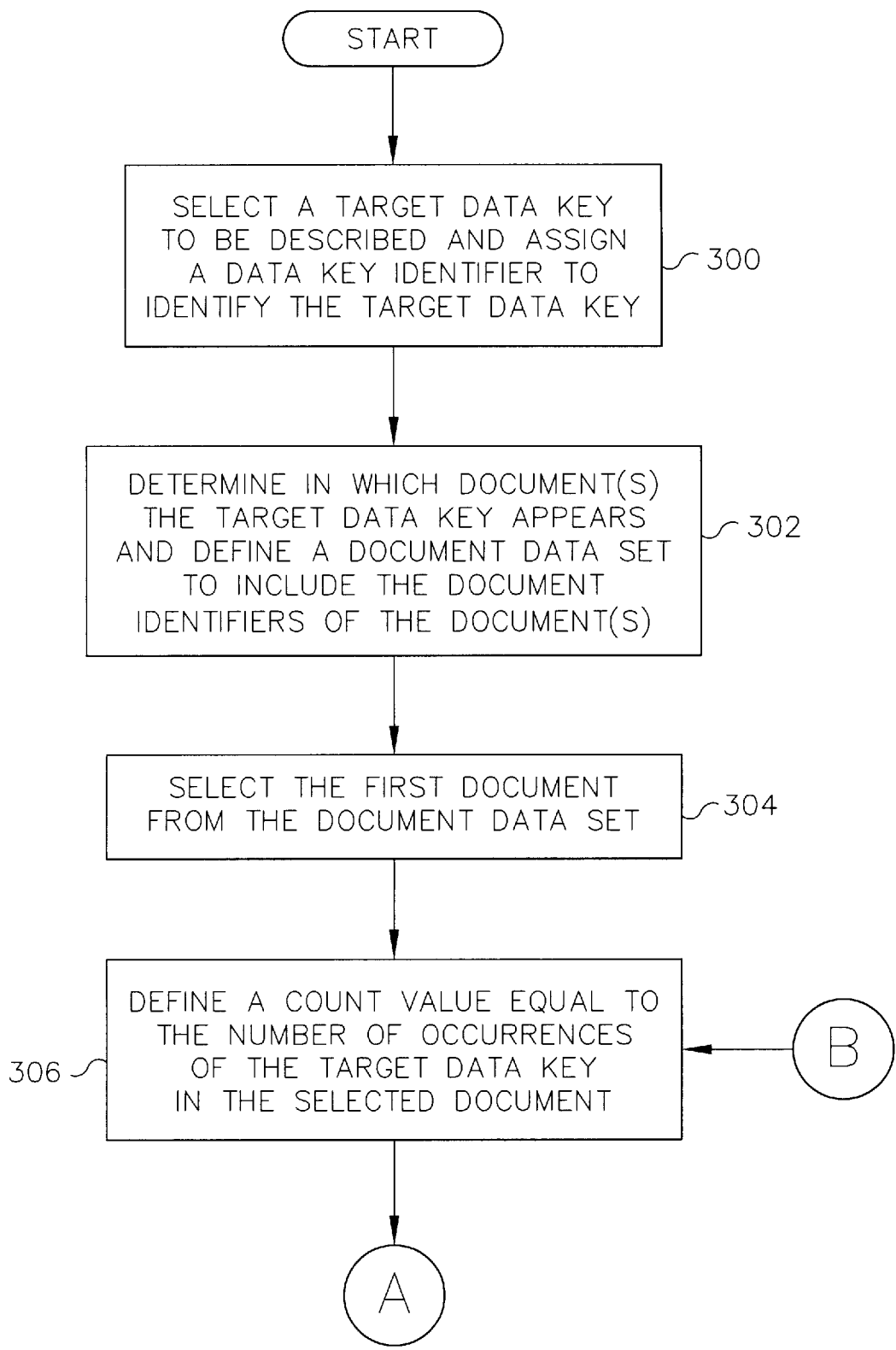
FIGS. 3A, 3B, and 3C are decision flow diagrams illustrating the method of the subject invention for storing text index data.
Figure 3B:
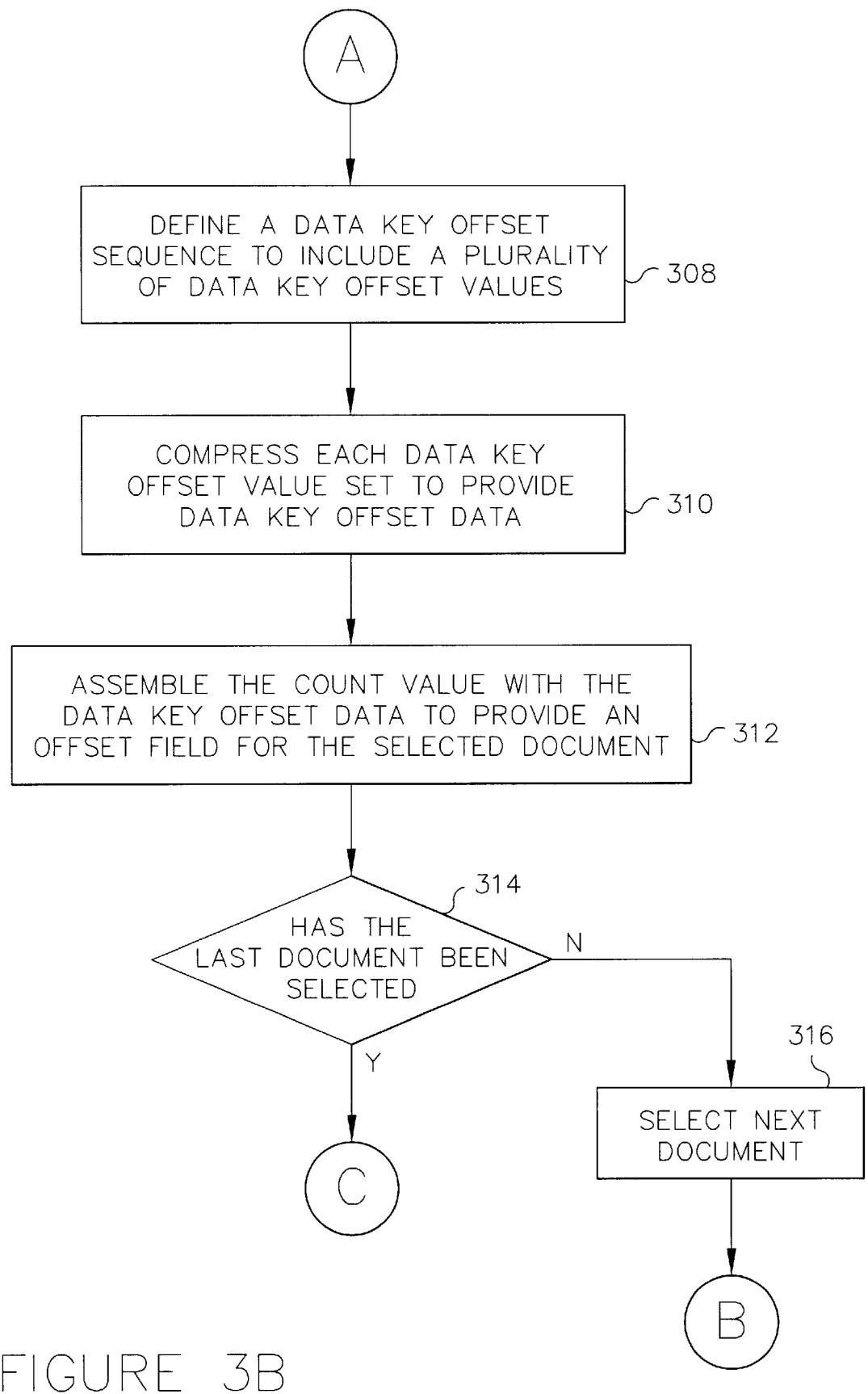
Figure 3C:
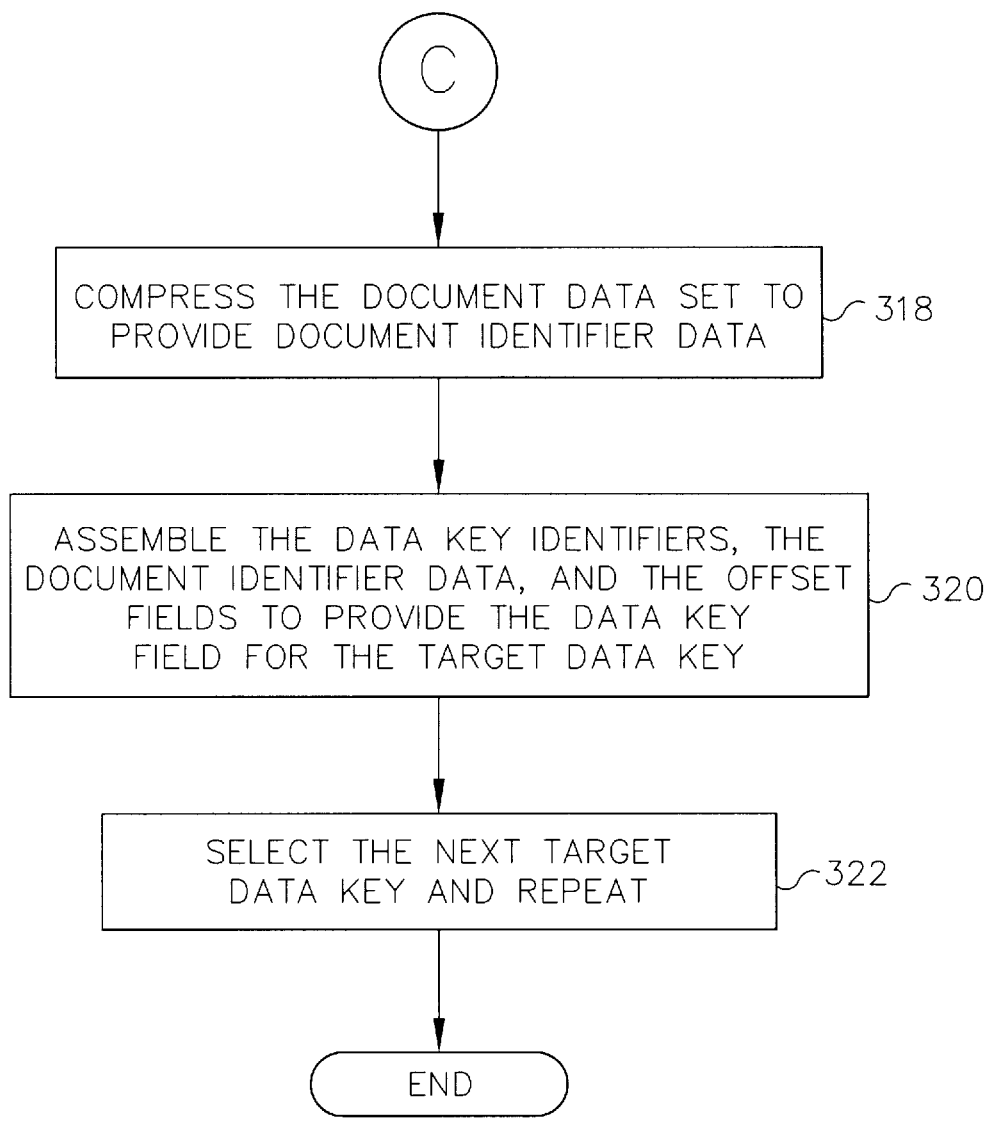

With reference to FIG. 3a, 3b, and 3c, a method is illustrated for providing the plurality of data key fields 100, discussed above. Initially, a data key identifier 102 is assigned to identify a text sequence, referred to herein as a target data key, step 300. The target data key may be any text or data sequence for which a data key field is desired. In the example discussed above, the target data key may be a specific word that appears in the periodical database. Thereafter, each document in which the target data key appears is identified so that a document data set is defined wherein the document data set includes the document identifier of each document in which the target data key appears, step 302. With further reference to the example discussed above, the document data set will include the document identifier to identify each article in which the target data key, or particular word, appears. Thereafter, the first document from the document data set is selected so that the offset field 106 (FIG. 1) may be determined, step 304.

To provide the offset field 106, the method determines the number of occurrences of the target data key in the selected document and provides a count value indicative of the number of occurrences, step 306. Thereafter, a data key offset sequence is provided and includes a plurality of data key offset values indicating the location of the target data key within the first document, as discussed above, step 308 (FIG. 3B). In accordance with the method of the subject invention, each data key offset sequence is then compressed to minimize the data required to express the offset sequence for the subject document, step 310. Although a variety of methods may be used for compressing the data key offset sequences, a particular method is used in a presently preferred embodiment of the invention, as will be discussed in more detail below, by reference to FIGS. 4 and 5.

After the data key offset value set is compressed, by whatever method selected, the compressed data is assembled with the count value to provide the offset field for the selected document, step 312. A decision is then made to determine if the last document of the document data set (defined in step 302, above) has been selected and, if not, the next document is selected, step 316, and steps 306–316 repeated until an offset field has been provided for each document identified in the document data set. Thereafter, the document data set is compressed to provide the document identifier data 104 illustrated in FIG. 1, step 318 (FIG. 3C). As with the compression of the data key offset value set discussed by reference to step 310, compression of the document data set may be provided by a variety of methods known in the art. However, the presently preferred method for compressing the document data set will be described below by reference to FIGS. 6A, 6B, 6C, and 6D.

The data key field 100 is then assembled using the data key identifier 102, the document identifier data, and the offset field, step 320. The next target data key is selected and the methods of FIGS. 3A, 3B and 3C repeated until each target data key has been provided with a data key field 100, step 322.

As mentioned above, the offset fields 106 and document identifier data 104 are both compressed to reduce the memory necessary for storage of the plurality of data key fields 100. As also discussed above, the offset field 106 includes a plurality of offsets each identifying the location of a data key within a document using as a reference the previous location of the data key. A presently preferred method for compressing the offset field 106 is described in the decision flow diagram of FIGS. 4 and 5.

Figure 4:
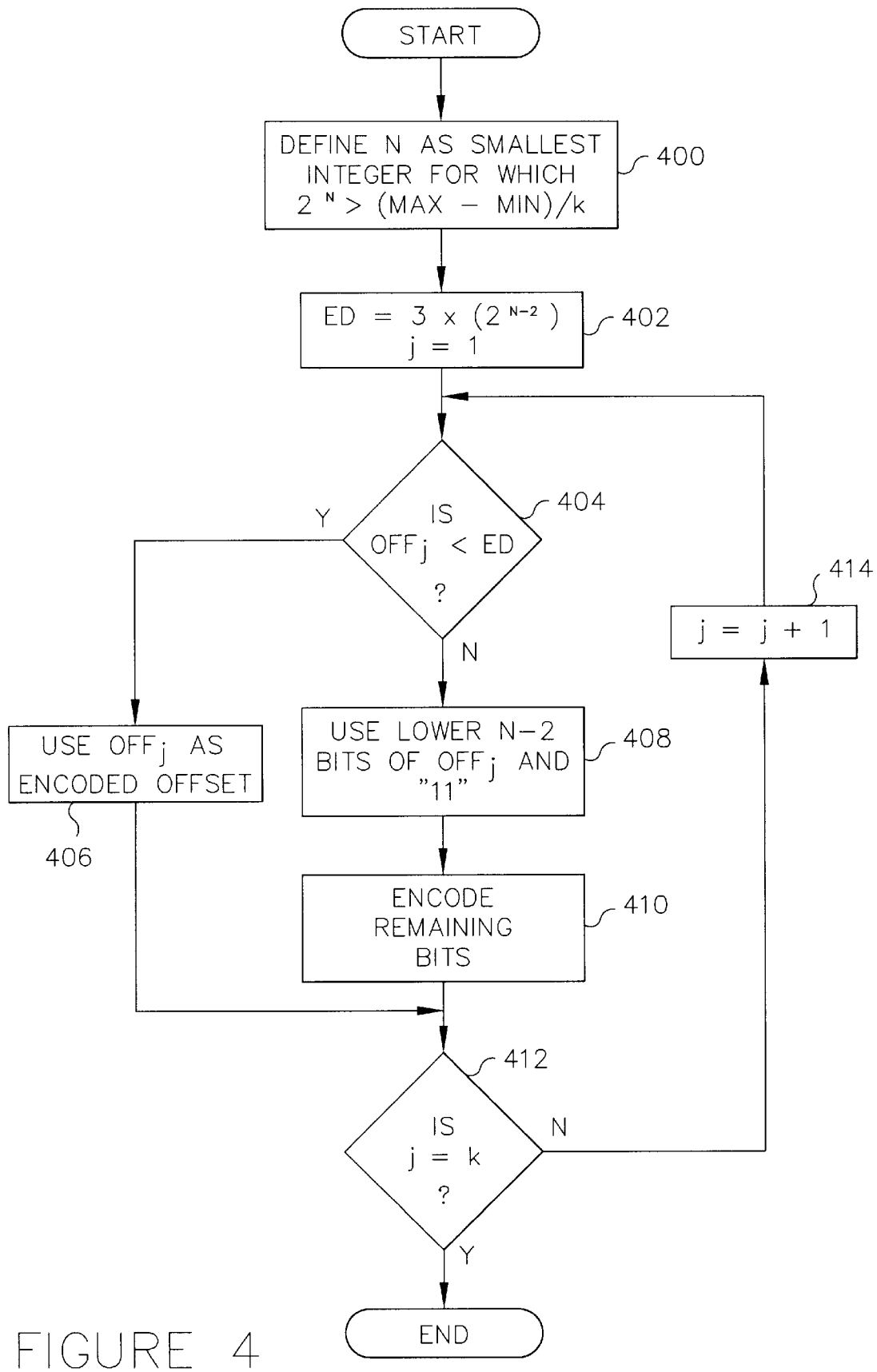
FIG. 4 is a decision flow diagram illustrating the method for storing the offset field data illustrated in FIGS. 1 and 2.

Generally, each offset data sequence (step 308, FIG. 3B) is compressed by encoding the sequence in accordance with the method illustrated in FIG. 4. Therein, a variable length encoding technique is described that first defines a reference number N as the smallest integer for which:

$$2^N > (\text{max} - \text{min})/k, \qquad (1)$$

step 400, wherein max (maximum) is the last data key offset in the document, ie., the offset that identifies the 70$^{th}$ word, and min (minimum) is the first data key offset in the document, i.e., the offset that identifies the 20$^{th}$ word, so that maximum minus minimum refers to the range of data keys in the document, and wherein k refers to the number of data keys in the document, i e., the count of offsets, as discussed above by reference to step 306 (FIG. 3A). After the referenced number, N, has been defined an encoding variable ED is defined as follows:

$$ED = 3 \times (2^{N-2}). \qquad (2)$$

ED represents one more than the maximum number that can be represented using N bits without having both of the two highest order bits set equal to 1. As an example, if the reference number N is equal to 7, then the encoding variable ED is equal to 96. In this example, 95 is the highest number that can be represented without setting both of the most significant data bits, i.e., 1011111 is the highest binary number that can be represented without setting both of the most significant data bits and is equal to 95.

Returning to FIG. 4, each offset is compared to the encoding variable ED, step 404. If the offset value is less than the variable ED, in the example above less than 95, then the offset value is used without encoding, step 406. However, if the offset is equal to or greater than the variable ED, then the lower N-2 bits of the offset is used, step 408, in combination with "11". It will be apparent to those skilled in the art that since only offsets less than the encoding variable ED are used without encoding, setting the two most significant bits of any field will indicate that the offset is greater than ED and that only the least significant N-2 bits of the offset have been provided. Stated differently, any time either of the most significant two bits of a field are not set, then the offset value was less than the variable ED, in the example above less than 96, and the field is not encoded. Conversely, if both of the most significant bits of a field are set, then the offset value was greater than the variable ED and the field is encoded.

As stated above, if the offset is greater than the variable ED, the least significant N-2 bits of the offset are used and combined with "11" to indicate that the field has been encoded. The most significant bits of the offset are then encoded, step 410, according to a predetermined encoding method. The index variable j is compared to the number of offset values to determine whether each offset has been encoded, step 412, and, if not, the index variable j is incremented, step 414, and steps 404–414 are repeated until each offset of the offset data sequence has been encoded.

Figure 5:
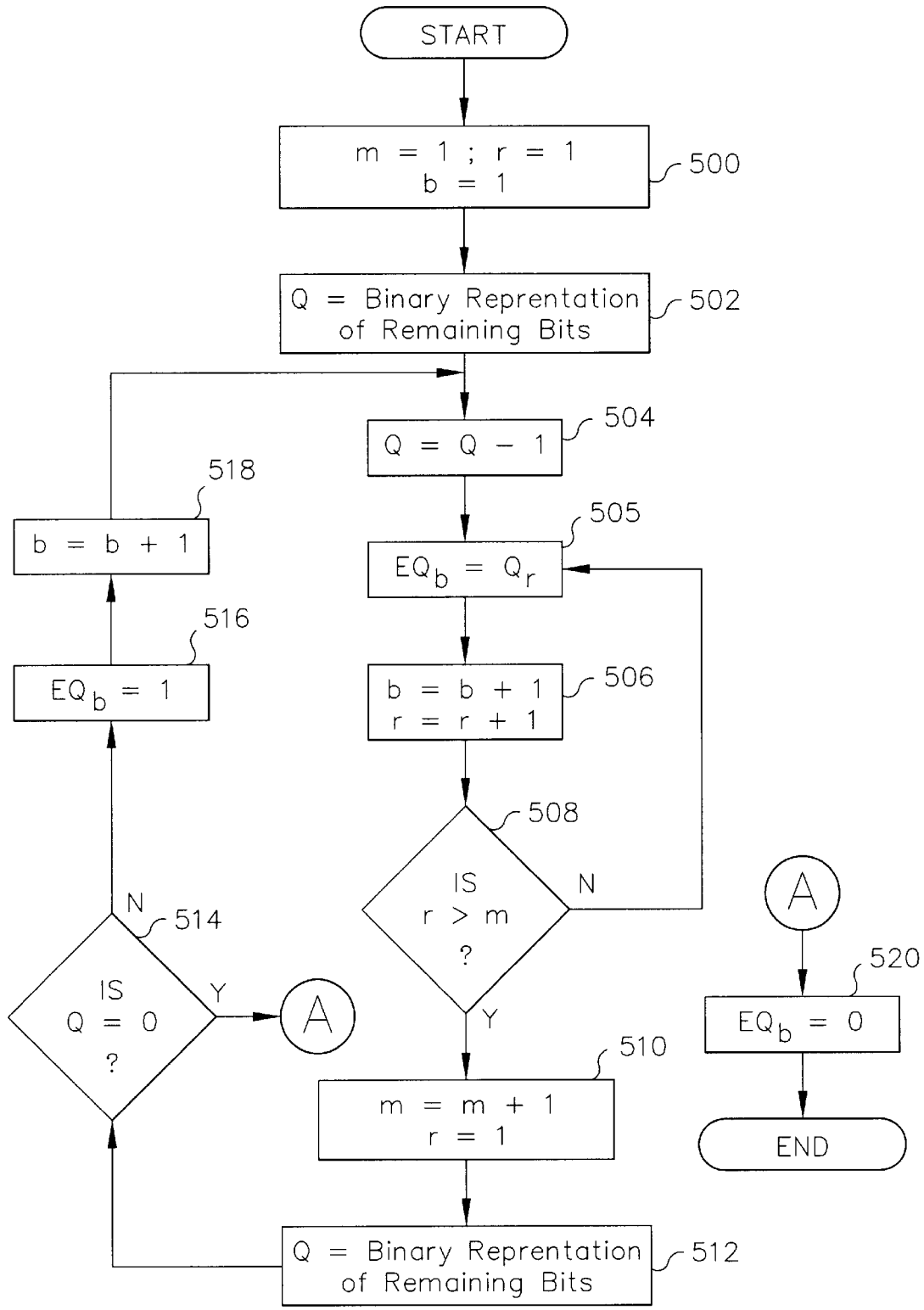
FIG. 5 is a decision flow diagram illustrating the method for storing the offset field data illustrated in FIGS. 1 and 2.
Figure 6A:
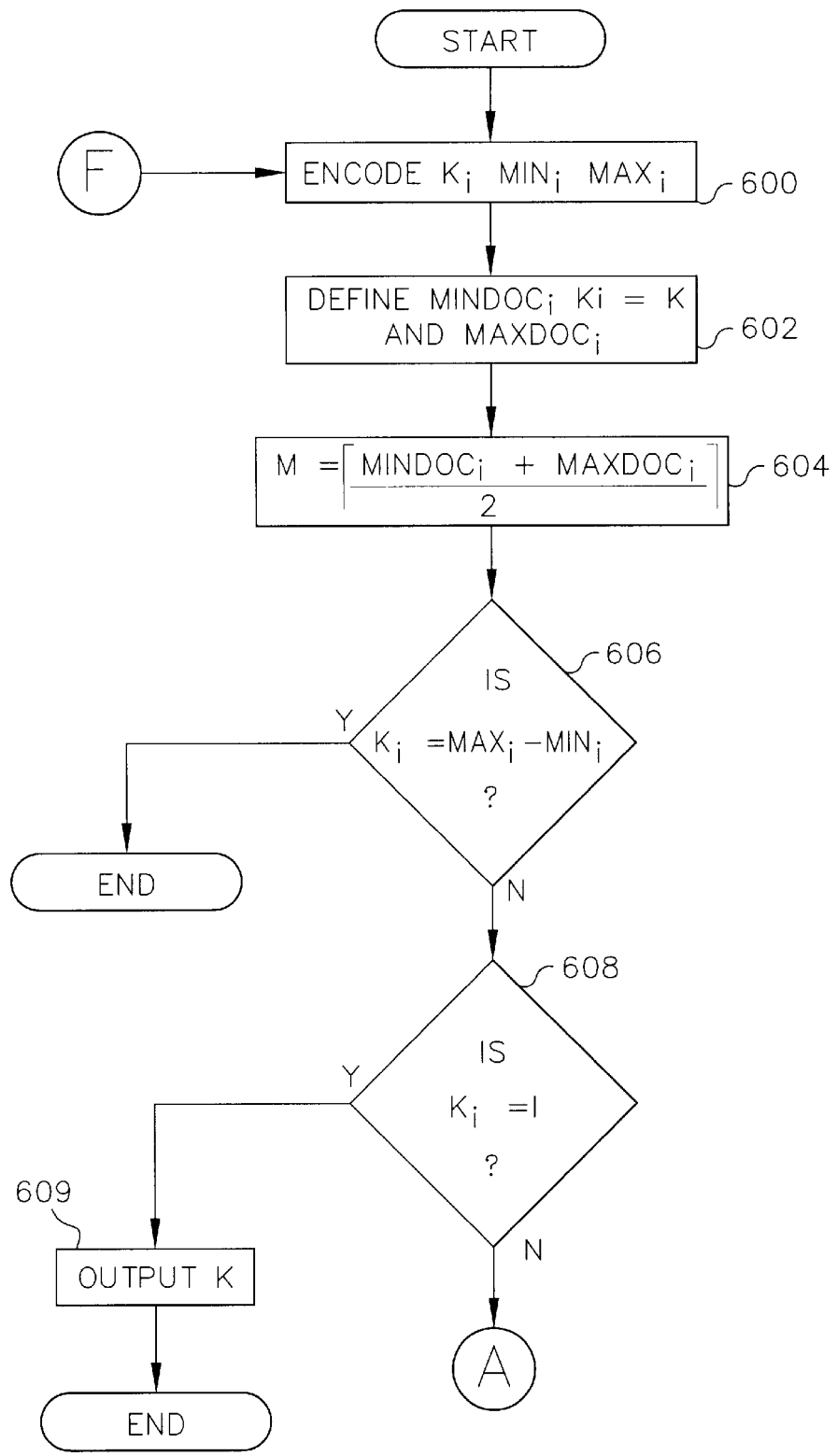
FIGS. 6A, 6B. 6C, and 6D are decision flow diagrams illustrating the method for storing document identifier data illustrated in FIGS. 1 and 2.
Figure 6B:
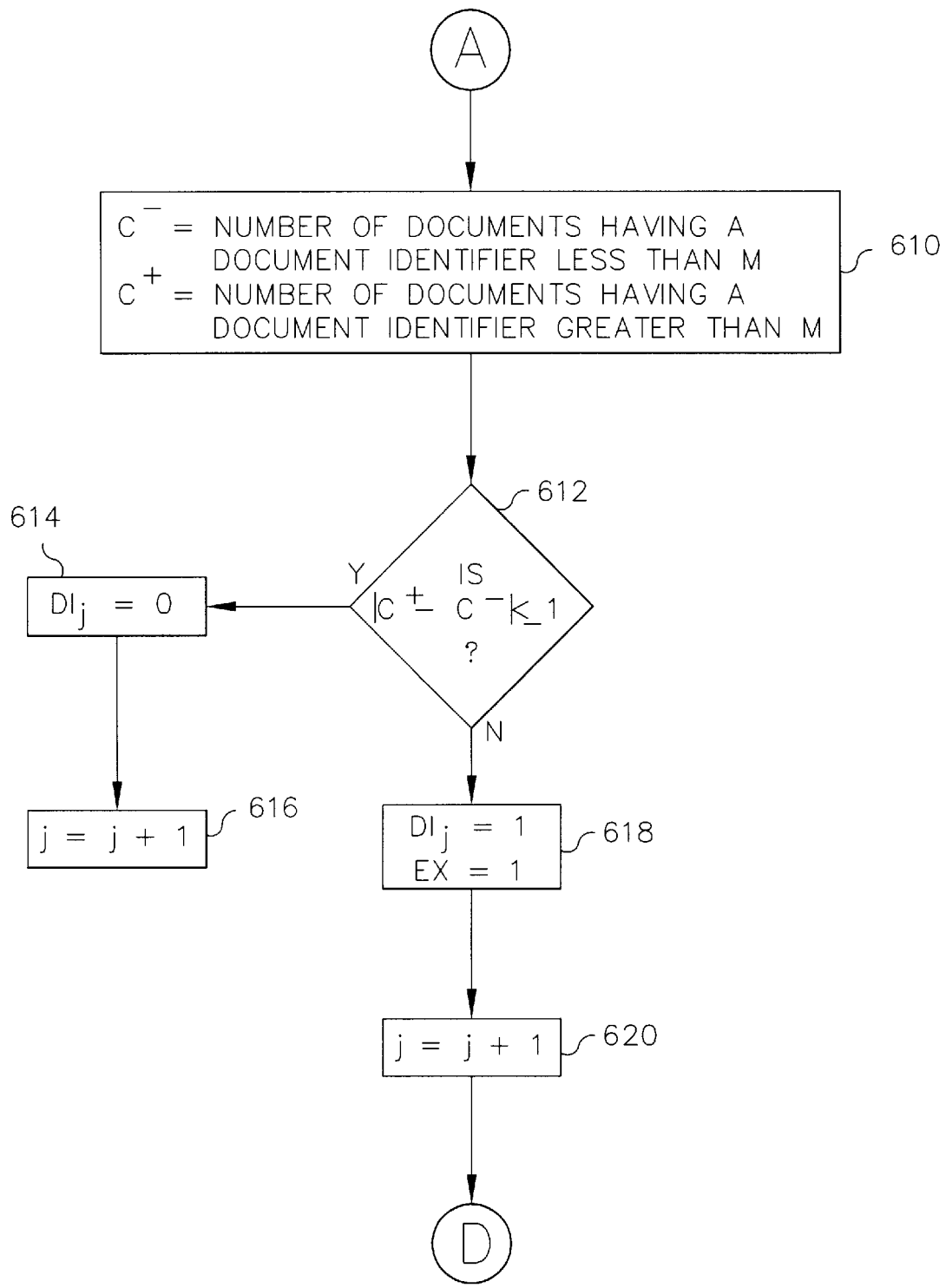
Figure 6C:
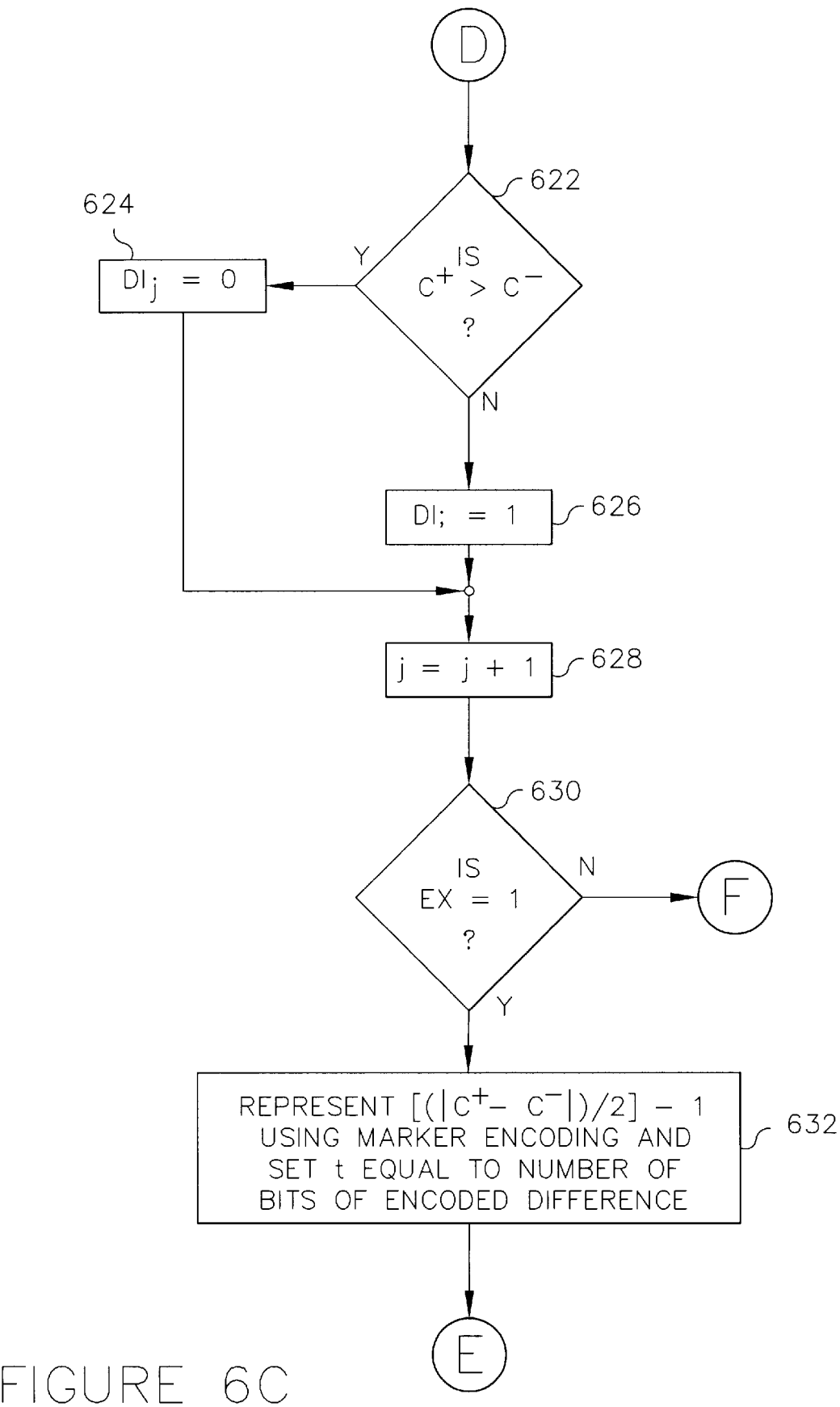
Figure 6D:
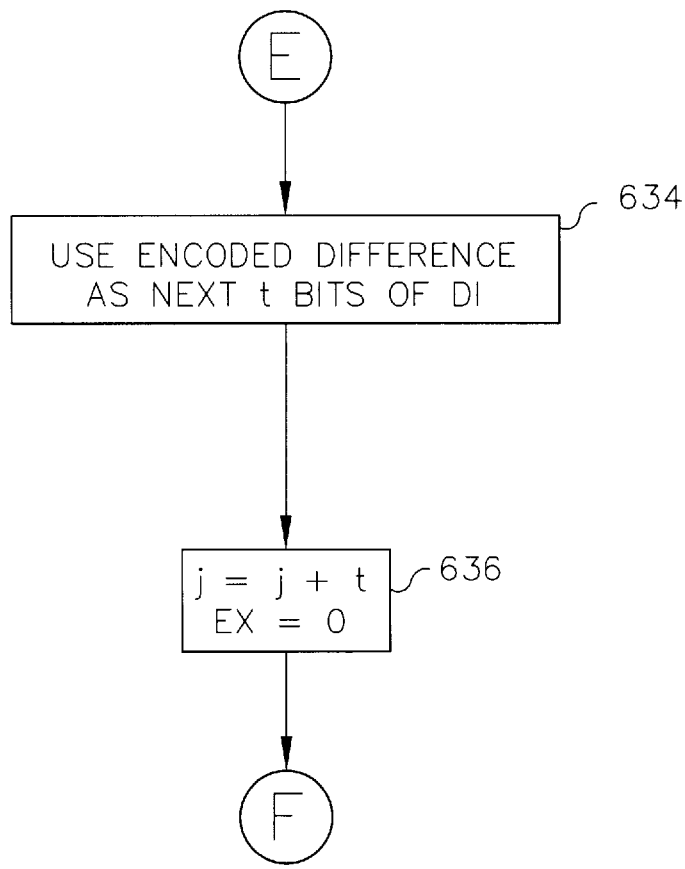

A presently preferred method for encoding the remaining data bits, referred to herein as the "Marker Encoding Method" and discussed by reference to step 410, is illustrated in FIG. 5. With reference to FIG. 5, a number of index values m, r, and b are each set to 1, step 500. Thereafter, Q is defined as a binary representation of the remaining bits, i.e., the most significant bits of the offset to be encoded (referred to in step 410, above), step 502. Since the binary representation is known to be non-zero, i.e., greater than 1, 1 is subtracted from Q to further minimize the memory overhead for the remaining bits, step 504. Thereafter, the first encoded bit EQ$_1$ is set equal to the least significant bit of Q, step 505. As an example, if the bits remaining after the least significant N-2 bits were selected, steps 408 and 410 of FIG. 4, is as follows:

$$Q = 1010, \qquad (3)$$

then, $$Q - 1 = 1001, \qquad (4)$$

step 504, and the least significant bit or EQ$_1$ equals 1, step 505. Thereafter, the index variables b and r are incremented, step 506, and the index variable r is compared to the index variable m, step 508. In accordance with the subject method, the number of remaining bits is assumed to be small. Accordingly, initially only one bit of Q is encoded, i.e., N=1. Thereafter, if further encoding is necessary, m is incremented so that additional bits will be encoded, as will be discussed below. Therefore, m represents the number of bits of the remainder to be encoded. The comparison of r with m in step 508 is to determine whether the appropriate number of bits of the remainder have been encoded.

In the example above, after being incremented r will be equal to 2 and m equal to 1, so that r will be greater than m and step 510 will be performed wherein m will be incremented by 1 and r will be returned to a value of 1. Q is then set equal to the binary representation of the bits remaining after the first bit(s) has been encoded, step 512. In the example above, after the least significant bit of 1001 is encoded, EQ$_1$=1, then the binary representation of the remaining bits is "100". If Q is equal to zero, step 514, then the method is ended, step 520. However, as in the example above, if Q is not equal to zero then the next encoded bit is set equal to 1, step 516, and the index variable b is incremented by 1, step 518. Steps 504–518 are repeated until Q is equal to 0, step 514, at which point the next encoded bit EQ$_b$ is set equal to zero, step 520.

Those skilled in the art will appreciate that steps 516 and 520 serve to provide indicators of whether the encoding is completed, i.e., a "1" indicates that further encoding is provided while a "0" indicates that the coding is terminated. Further, the encoding could be performed a single bit at a time so that every other bit would be indicative of whether further encoding existed. However, because of the determination of step 508, as discussed above, a first bit is encoded followed by an indicator. If the indicator indicates subsequent encoding, m is increased so that 2 bits are encoded followed by an indicator. If the indicator indicates subsequent encoding m is increased so that 3 bits are encoded followed by a subsequent indicator, etc. Other ways for increasing the encoding will be readily apparent to those skilled in the art.

In addition to compressing the offset field 106 (FIG. 1), the document identifier data 104 is also compressed. A presently preferred method for compressing the document identifier data 104 is illustrated in the decision flow diagrams of FIGS. 6A, 6B, 6C, and 6D. Although the method is described by reference to the document identifier data 104 discussed above by reference to FIGS. 1, 3A, 3B, and 3C, it will be appreciated by those skilled in the art that the method illustrated in FIGS. 6A, 6B, 6C, and 6D is applicable to any data sequence and particularly applicable to data sequences wherein the data is relatively evenly distributed.

With reference to FIGS. 6A, 6B, 6C, and 6D, a method is illustrated for encoding the document identifier data in accordance with a partitioning encoding method. A counter j and a stack are initialized at step 600. The counter j is used to identify the bits of the encoded document identifier data, the bits being stored in a bit 'a' bit array DIj. The stack is used so that the method of FIGS. 6A, 6B, 6C, and 6D will be performed recursively, as will be described in greater detail below. The document identifier data, or other sequence, is first examined to describe the number of elements in the sequence, i.e., the number of documents identified by the document identifier data, K, the minimum value of the elements in the sequence, MIN, and the maximum value of the elements in the sequence, MAX. Thereafter, variables K, MINDOC, and MAXDOC are defined, step 602. Initially, MINDOC and MAXDOC are equal to MIN and MAX, respectively. Thereafter, the midpoint between MINDOC and MAXDOC is described as M, step 604, as follows:

$$M = \text{ceiling} ((\text{MINDOC} + \text{MAXDOC})/2). \quad (5)$$

A decision is made to determine if the number of documents within the range is equal to the range, i.e., if the documents are spaced one from another, step 606, and, if so, the method proceeds to step 700 to evaluate the stack, as will be described below. Thereafter, a determination is made if the number of documents within the range is equal to 1, step 608, and, if so, the document identifier K is used as the next t bits of the encoding, steps 607 and 609, and the method proceeds to step 700. If neither of the foregoing criteria is true, then $C^+$ and $C^-$ are defined as the number of documents having a document identifier greater than or equal to M and the number of documents having a document identifier less than M, respectively, step 610. $C^+$ and $C^-$ are compared to determine whether $C^+$ differs from $C^-$ by either "0" (i.e., $C^+$ is equal to $C^-$) or "1" (i.e., $C^+$ is 1 more or 1 less than $C^-$), step 612, and, if so, an encoded identifier bit is set equal to "0" and the index variable j is incremented by 1, steps 614 and 616. If, however, a greater number of documents is either in the range above or less than M, then an encoded data bit is set equal to "1", step 618. Thereafter, the index variable j is incremented, step 620. Next, a determination is made as to whether $C^+$ is larger than $C^-$, step 622, and, if so, an encoded data bit is set equal to "0", step 624, and if not, an encoded data bit is set equal to "1", step 626. Thereafter, the index variable j is again incremented, step 628. Thereafter, step 632 is performed to represent the difference between the number of documents in the upper range and the number of documents in the lower range, and the encoded difference is used as the next t bits of the encoded document identifier data, step 634. Thereafter, the index variable j is incremented by the index variable t. The method returns to step 602 to identify another partition.

Returning to step 616 (FIG. 6B), after $C^+$ is compared to $C^-$ to determine whether they differ by either 0 or 1, step 612, and a zero encoded bit is added if the result of the comparison is affirmative, step 614 and step 616, then additional data bits are provided to characterize the nature of the difference. Particularly, a determination is made whether $C^+$ is greater than $C^-$, step 640, and, if so, a zero bit is provided as the next encoded data bit, step 642, and j incremented by 1, step 644. If $C^+$ is not greater than $C^-$, step 640, then a determination is made as to whether $C^-$ is greater than $C^+$, step 646. If so, a 1 is added as the next encoded data bit, step 648, and the index variable j is incremented by 1, step 650. If $C^+$ is equal to $C^-$, i.e., the determination in both step 640 and 646 is negative, then no additional encoded data bits are added. Those skilled in the art will appreciate that steps 610–628 and 640–650 are provided to characterize the distribution of the documents within the range MINDOC to MAXDOC. The range is partitioned by the value M and encoded data bits are provided, the first identifying whether an equal number of documents is in the range above M as below m, and the second identifying whether more documents are provided in the range above M than are in the range below M.

So that the method can be performed recursively, the range characterized by steps 610–628 and 640–650 is divided in half and the method of steps 604–636 repeated for each half of the range. The stack is used to remember the state of that portion of the range that is saved for later operation. Accordingly, the state of the stack is incremented by 1 and variables defining the upper portion of the range to be remembered are stored on the stack, step 702. Thereafter, variables to operate upon the lower portion of the partitioned range are defined, step 704. In similar fashion, after it is determined that either the number of documents in a range is equal to the range, step 606 or the number of documents in a range is equal to 1, step 608 then the stack is consulted to determine whether any upper portions remain to be encoded, step 700. If the state variable is equal to 0, then no upper portions remain and the method is ended. Alternatively, if the state variable is non-zero, then the range to be operated upon is defined by the last entry on the stack and the state variable decreased by 1, step 706.

From the foregoing it will be appreciated that, although a specified embodiment of the invention has been described herein for purposes of illustration, various modifications may be made without deviating from the spirit and scope of the invention. Accordingly, the invention is not limited except as by the appended claims.

We claim:

1. A computer-implemented method for encoding a plurality of data values, the method comprising:

defining a range of the plurality of data values by selecting a minimum value and a maximum value as endpoints of the range;

selecting an intermediate point between the endpoints of the range of the plurality of data values;

partitioning the range of the plurality of data values into a first sub-range and a second sub-range at the intermediate point; and providing encoded data characterizing how the data values are distributed between the first and second sub-ranges wherein the encoded data identifies each of the data values in the range.

2. The method as recited in claim 1 further comprising:

determining whether the first sub-range consists of one data value or includes a data value for each possible data value in the first sub-range;

if the first sub-range consists of one data value, then outputting an indication of the one data value;

if the first sub-range includes a data value for each step in the first sub-range, then stopping encoding for the first sub-range; and if the first sub-range includes more than one data value and less than a data value for each step in the first sub-range, then partitioning the first sub-range into sub-sub-ranges and providing encoded data that characterize how the data values are distributed between the sub-sub-ranges, the encoded data identifying each of the target document identifiers in the first sub-range.

3. The method of claim 1 wherein the step of providing encoded data characterizing the distribution includes the substeps of:

characterizing the distribution of data values in the first sub-range based on whether the first sub-range is empty or full of data values;

characterizing the distribution of data values in the second sub-range based on whether the second sub-range is empty or full of data values; and characterizing the distribution of data values in the first sub-range in relation to the second sub-range.

4. The method of claim 3 wherein the substep of characterizing the distribution of data values in the first sub-range in relation to the second sub-range includes outputting an indication of the difference between a number of data values in the first sub-range and a number of data values in the second sub-range.

5. The method of claim 4 wherein the step of outputting an indication of the difference includes:

outputting a first indication when there are greater than one more data values in the first sub-range than in the second sub-range; and outputting a second indication when there are greater than one more data values in the second sub-range than in the first sub-range.

6. The method of claim 5 wherein the step of outputting an indication of the difference further includes:

outputting a third indication when there is only one more data value in the first sub-range than in the second sub-range;

outputting a fourth indication when there is only one more data value in the second sub-range than in the first sub-range; and outputting a fifth indication when there are equal numbers of data values in the first and second sub-ranges.

7. The method of claim 6 wherein the first indication is 11, the second indication is 10, the third indication is 01, the fourth indication is 00, and the fifth indication is 0.

8. The method of claim 3 wherein when either of the first and second sub-ranges includes only one data value, the step of providing encoded data includes providing an indication of the one data value.

9. The method of claim 3 wherein a sub-range is empty when there are no data values in the sub-range and the sub-range is full when a maximum value for the sub-range minus a minimum value for the sub-range equals the number of data values in the sub-range.

10. The method of claim 9 wherein no data is output for the sub-range when the sub-range is empty or full.

11. A computer-implemented method for encoding a plurality of data values comprising the steps of:

selecting a base number N of data bits;

selecting a most significant portion r of the data bits from the base number N of data bits to indicate whether each of the plurality of data values is encoded and identifying a least significant portion q of the data bits of the base number N so that r+q=N; and determining whether a current data value of the plurality of data values can be represented with N bits without all of the r most significant data bits set to logic state 1 and, if so, representing the current data value with N data bits and, if not, representing the current data values as an encoded data value by setting the r most significant data bits of the encoded data value to logic state 1, representing the q least significant data bits of the current data value, and encoding the data bits of the current data value that are more significant than the q least significant data bits.

12. The method as recited in claim 11 wherein the step of selecting a base number N of data bits, comprises the substep of:

determining the average value of the plurality of data values to be encoded and selecting N as the number of bits necessary to represent the average value.

13. The method as recited in claim 11 wherein the step of selecting a base number N of data bits comprises the substep of selecting N so that:

$$2^N > (\text{max}-\text{min})/k$$

wherein k represents the number of data values, max represents the maximum data value, and min represents the minimum data value.

14. The method as recited in claim 11 wherein the step of determining whether a current data value can be represented with N bits without all of the r most significant bits set to logic state one comprises the substep of determining whether the current data value is less than $3(2^{N-r})$.

15. A computer-implemented method for encoding a plurality of data values, the data values being ordered in an initial range from a minimum value to a maximum value, comprising:

outputting the minimum value, the maximum value, and an indication of the number of data values in the range;

selecting the initial range to be a current range; and encoding the data values within the current range according to the following substeps:

when there are no data values in the current range or the current range is full of data values, then ending the encoding step for the current range;

when there is only one data value in the current range, then outputting an indication of the one data value and ending the encoding step for the current range;

partitioning the current range into first and second ranges;

outputting an indication of the difference between the number of data values in the first range and the number of data values in the second range;

recursively performing the encoding step with the first range as the current range; and recursively performing the encoding, step with the second range as the current range.

16. A computer-implemented method of encoding a plurality of data values, the plurality of data values forming a range, the method comprising:

dividing the range of data values into two ranges;

outputting an indication of the difference between a number of data values in each of the ranges;

for each of the divided ranges, repeating the dividing and outputting steps until each of the ranges resulting from the dividing steps has no data values, has a data value for every possible data value in the range, or has only one data value; and when a divided range has only one data value, outputting an indication of the data value.

17. The method of claim 16 wherein the step of outputting an indication of the difference includes:

outputting a first indication when there are greater than one more data values in a first one of the divided ranges than in a second one of the divided ranges; and outputting a second indication when there are greater than one more data values in the second divided range than in the first divided range.

18. The method of claim 17 wherein the step of outputting an indication of the difference further includes:

outputting a third indication when there is only one more data value in the first divided range than in the second divided range;

outputting a fourth indication when there is only one more data value in the second divided range than in the first divided range; and outputting a fifth indication when there are equal numbers of data values in the first and second divided ranges.

19. The method of claim 18 wherein the first indication is 11, the second indication is 10, the third indication is 01, the fourth indication is 00, and the fifth indication is 0.

20. The method of claim 16 wherein no data is output for a range when the range has no data values or has a data value for every possible data value in the range.

21. A computer-readable storage medium having executable instructions for encoding a plurality of data values, the executable instructions causing the computer to:

select a base number N of data bits;

select a most significant portion r of the data bits from the base number N of data bits to indicate whether each of the plurality of data values is encoded;

identify a least significant portion q of the data bits of the base number N so that r+q=N; and determine whether a current data value of the plurality of data values can be represented with N bits without all of the r most significant data bits set to logic state 1 and, if so, represent the current data value with N data bits and, if not, represent the current data values as an encoded data value by settling the r most significant data bits of the encoded data value to logic state 1, representing the q least significant data bits of the current data value, and encoding the data bits of the current data value that are more significant than the q least significant data bits.

22. The computer-readable storage medium of claim 21 wherein the executable instructions that cause the computer to select a base number N of data bits, comprise the executable instructions that cause the computer to:

determine the average value of the plurality of data values to be encoded and select N as the number of bits necessary to represent the average value.

23. The computer-readable storage medium of claim 21 wherein the executable instructions that cause the computer to select a base number N of data bits comprise the executable instructions that cause the computer to select N so that:

$2^N > (max-min)/k$ wherein k represents the number of data values, max represents the maximum data value, and min represents the minimum data value.

24. The computer-readable storage medium of claim 21 wherein the executable instructions that cause the computer to determine whether a current data value can be represented with N bits without all of the r most significant bits set to logic state one comprise executable instructions that cause the computer to determine whether the current data value is less than $3(2^{N-r})$.

25. A computer-readable storage medium having executable instructions for encoding a plurality of data values, the plurality of data values forming a range, the executable instructions causing the computer to:

divide the range of data values into two ranges;

output an indication of the difference between a number of data values in each of the ranges;

repeat the dividing and outputting steps for each of the divided ranges until each of the ranges resulting from the dividing steps has no data values, has a data value for every possible data value in the range, or has only one data value; and when a divided range has only one data value, output an indication of the data value.

26. The computer-readable storage medium of claim 25 wherein the executable instructions that cause the computer to output an indication of the difference include executable instructions that cause the computer to:

output a first indication when there are greater than one more data values in a first one of the divided ranges than in a second one of the divided ranges; and output a second indication when there are greater than one more data values in the second divided range than in the first divided range.

27. The computer-readable storage medium of claim 26 wherein the executable instructions that cause the computer to output an indication of the difference further include executable instructions that cause the computer to:

output a third indication when there is only one more data value in the first divided range than in the second divided range;

output a fourth indication when there is only one more data value in the second divided range than in the first divided range; and output a fifth indication when there are equal numbers of data values in the first and second divided ranges.

28. The computer-readable storage medium of claim 27 wherein the first indication is 11, the second indication is 10, the third indication is 01, the fourth indication is 00, and the fifth indication is 0.

29. The computer-readable storage medium of claim 25 wherein no data is output for a range when the range has no data values or has a data value for every possible data value in the range.

* * * * *